United States Patent [19]

Goff et al.

[11] 4,245,827

[45] Jan. 20, 1981

[54] HOLD-DOWN CLAMP

[76] Inventors: Otis W. Goff, 5221 Woodmont Dr., Kalamazoo, Mich. 49001; Melvin J. Goff, 2454 52nd, SW., Wyoming, Mich. 49509

[21] Appl. No.: 67,622

[22] Filed: Aug. 17, 1979

[51] Int. Cl.[3] .................... B23Q 3/02

[52] U.S. Cl. .................... 269/94; 269/239; 269/246

[58] Field of Search .................... 269/99-100, 269/91, 94, 237, 239, 249, 246

[56] References Cited

U.S. PATENT DOCUMENTS

| | | | |
|---|---|---|---|
| 1,131,869 | 3/1915 | Schade | 269/91 |
| 2,705,441 | 4/1955 | Armstrong | 269/91 |
| 2,726,693 | 12/1955 | Saxton | 269/94 |
| 3,865,360 | 2/1975 | Schweidler | 269/100 |

*Primary Examiner*—Robert C. Watson

*Attorney, Agent, or Firm*—Gordon W. Hueschen

[57] ABSTRACT

A hold-down clamp comprises a base member adapted to be affixed to the bed of a machine tool, a clamping face adapted to clamp a work piece thereto, a vertical member rigidly affixed to the base member, a dogleg-shaped arm having one end pivoted to a mid-point in said vertical member and the other end to said clamping face, and an elongated screw between the upper end of the vertical member and the knee of the dogleg for moving the clamping face to and from the work piece.

1 Claim, 3 Drawing Figures

HOLD-DOWN CLAMP

FIELD OF INVENTION AND PRIOR ART

The invention relates to a hold-down clamp suitable for clamping a work piece to a machine tool bed, such as a lathe bed, drill press bed, milling machine bed, or the like.

Work pieces have heretofore been clamped to the bed of a machine tool by means of cantilever clamps, one end of which holds down the work piece and the other end of which is supported by a block which might suitably be an adjustable block. The mid-portion of the hold-down piece is bolted to the bed by a bolt having a "T" head or a "T" nut adapted to fit an undercut groove in the bed. These prior art devices have the disadvantage of requiring special blocks to adjust the height of the hold-down member so that one in setting up a machine has to rummage around for the right sized blocks to fit the work piece.

OBJECTS OF THE INVENTION

It is an object to provide an improved hold-down clamp for clamping the work piece to the bed of a machine tool. It is a further object of the invention to provide a hold-down clamp of the class described, which is a unitary structure. It is a further object of the invention to provide a hold-down clamp of the class described, which can easily be attached to the bed of a machine tool and actuated quickly to clamp the work piece to the bed. Further objects of the invention are to avoid the disadvantages of prior art and to obtain such advantages as will appear as the description proceeds.

BRIEF DESCRIPTION OF THE INVENTION

The invention relates to a hold-down clamp for clamping the work piece to the bed of a machine tool which comprises a base member, adjustable means for adjustably affixing the base member to the bed, a clamping arm having one end pivoted to the base member, a clamping face pivoted at the other end of the clamping arm, which clamping arm extends beyond the base member so that the clamping face is in position to engage a work piece resting on the bed of the machine tool, and a clamping means between the base member and the clamping arm operative to move the clamping arm to and from clamping position and to clamp the clamping face to the work piece after the clamping face has been brought in contact therewith.

Advantageously, the base member comprises a horizontal component and a vertical component, the adjustable means is comprised in the horizontal component and is adapted to clamp the same to the bed, and the clamping arm is pivoted to the vertical component.

Advantageously, the clamping arm is pivoted to an intermediate portion of the vertical component and the clamping means extends from the upper end of the vertical component to a part of the clamping arm which is remote from the vertical component and comprises means for causing a clamping arm to rotate about its pivot point and to exert pressure on the work piece when the clamping face is brought into contact therewith.

Advantageously, the clamping arm comprises a dogleg-shaped member having a knee, a laterally projecting portion which projects laterally from the vertical component to the knee, and downwardly projecting portion which projects downwardly from the knee to the clamping face.

Advantageously, the clamping means comprises an elongated screw which is threaded in a nut member pivoted adjacent the upper end of the vertical component and has one free end rotatably connected to the clamping arm at the knee by means of a thrust bearing.

Advantageously, the horizontal component comprises an elongated block having a hole adjacent the end nearest the clamping face, which hole is adapted to receive a bolt having a "T" connector adapted to fit into an undercut slot in the machine tool bed or into a tapped hole in the machine bed.

Advantageously, the vertical component comprises two thin, narrow plates rigidly affixed to the horizontal component of the base member adjacent the hole therein and the nut member comprises trunnions journaled in these thin, narrow plates. Also, it is of advantage if the clamping arm also comprises two thin, narrow parallel plates.

If desired, the vertical component can be braced by a brace extending diagonally upward from adjacent the end of the horizontal component remote from the hole therein and the point where the vertical component is affixed to the base to a point in the vertical component between the two pivot points therein, that is to say, the point where the nut member is pivoted and the point where the dogleg-shaped member is pivoted. Advantageously, this brace also comprises two thin, narrow plates affixed at one end to each side of said horizontal component and at the other end to the inner side of each thin, narrow plate forming the vertical component.

DETAILED DESCRIPTION OF THE INVENTION

Figure 3:
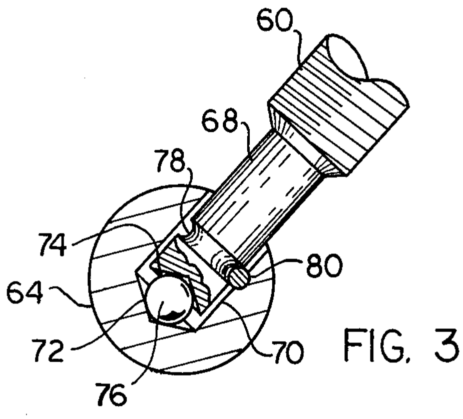
FIG. 3 is a detailed view in partial section of the thrust bearing.
Figure 1:
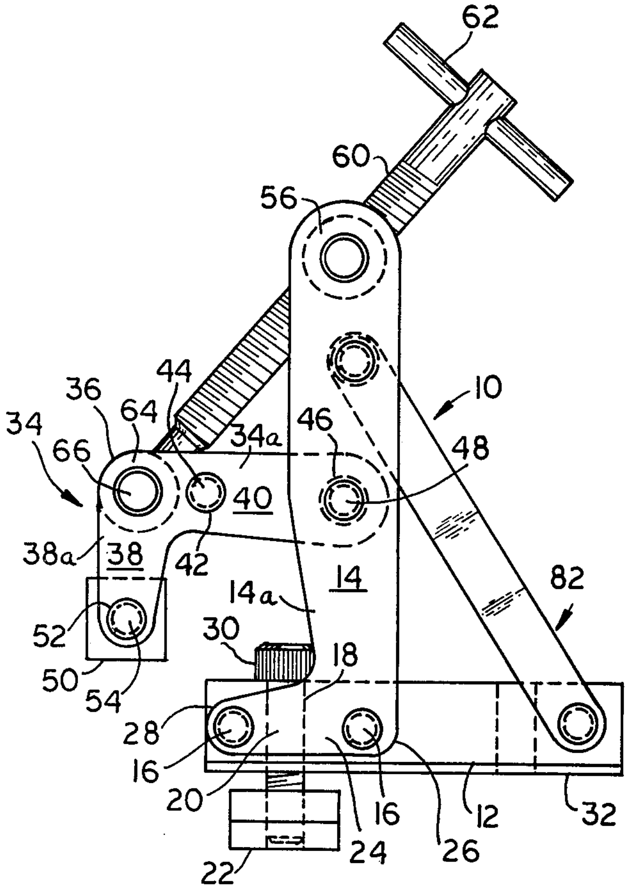
FIG. 1 is a side elevation.
Figure 2:
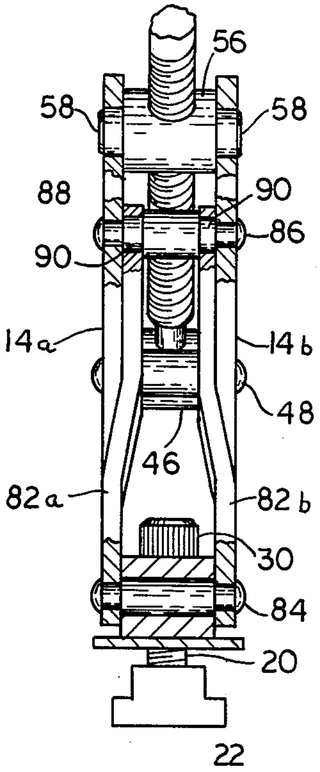
FIG. 2 is an end elevation with partial section.

Referring now to FIGS. 1, 2 and 3 of the drawing, the hold-down clamp according to the invention comprises a base member 10, having a horizontal component or block 12, and a vertical component 14 composed of two parallel, thin narrow plates **14*a* and 14*b* affixed to the horizontal block 12 by rivets 16. Elongated block 12 has a hole 18 adjacent the front end thereof for receiving the bolt 20, which has a "T" nut 22** adapted to fit the ordinary undercut slot in the base of a lathe or drill press.

Each side **14*a* and 14*b* of the vertical component has an elongated foot 24 extending from the heel 26 to the toe 28. The vertical component 14 extends vertically upward from the heel portion of the foot 24, and the hole 18 is located forward of the heel section, either in the toe portion or the ankle portion of the foot 24. The rivets 16 unite the vertical component 14 and the horizontal component 12 into a unitary base member 10, and bolt 20 and the nut 22 rigidly affix this base member to the bed of the machine tool. The horizontal component 12 extends out beyond the heel 26 so that when a thrust is applied to the vertical component 14 in the direction of the arrow a, an upward thrust is placed on the head 30 of the bolt 20, and a downward thrust is placed on the machine tool bed to the extended rear portion 32 of the horizontal component 12**.

Pivoted intermediate the vertical component 14 is a dogleg-shaped member 34 having a knee portion 36, a short leg 38 and a long leg 40. The dogleg-shaped member 34 is also made up of plates 34*a* and 34*b* (not visible in the drawings as it is behind plate 34*a* ) which are held apart by spacers 42 and fastened together by rivets 44. The long leg 40 is journaled on trunnions 46 which also functions as a spacer and is held in that position by rivet 48.

At the free end of the short leg is a clamping block 50 which is rotatably mounted between the legs 38*a* and 38*b* on trunnion 52 which also functions as a spacer and is held in that position by the rivet 54.

A nut member 56 is journaled in the upper end of the plates 14*a* and 14*b* by trunnions 58. The nut is adapted to receive elongated threaded bolt 60 having a handle 62. The threaded bolt 60 projects to and into a block 64 which is journaled in the knee 36, of the dogleg-shaped member 34 on trunnions 66. The bolt 60 has an end 68 of reduced diameter which projects into a bore 70 in the member 64. The bore extends to a position beyond the axis of the trunnions 66 and is provided with a concave conical bottom 72. The end 68 has a complementary concave conical depression 74 therein. Between the two conical surfaces 72 and 74 is a ball bearing 76 which makes circle contact with the surfaces 72 and 74 at a point below the axis of the trunnion 66. The end 68 is rotatably fastened in the bore 70 by means of the annular channel 78 and pin 80.

When the handle 62 is rotated, the space between the nut member 56 and the block 64 is increased or decreased according to the direction of the rotation.

If desired, the vertical component can be reinforced by a brace 82 comprising side plates 82*a* and 82*b* which are riveted to the outside of the horizontal component 12 by rivet 84 and to the inner sides of the plates 14*a* and 14*b* by rivet 86 at a point intermediate between the pivot 48 and the nut member 56. A spacer 88 having shoulders 90 to space the plates 82*a* and 82*a* can be provided if desired.

In operation the nut 22 is inserted into an undercut slot on the bed of the machine tool and the head 30 rotated to tighten the bolt. A knurled head is suitable because this bolt, unlike the prior art devices, does not have to be tightened down. The clamping block 50 extends out over the end of the horizontal member 12 so that, when the forward end of the horizontal member is positioned adjacent the work piece, the clamping block will be over the work piece. Handle 62 is then turned to bring the clamping block 50 into contact with the work piece and then further turned to clamp the work piece in place. The thrust thus engendered tightens up the bolt 20 and firmly anchors the work piece on the bed of the machine tool.

It is to be understood that the invention is not to be limited to the exact details of operation or structure shown and described, as obvious modifications and equivalents will be apparent to one skilled in the art.

We claim:

1. A hold-down clamp for clamping a workpiece to a machine tool bed which comprises:

a base member having a horizontal component comprising an elongate block having parallel sides, a vertical component comprising two parallel, thin, narrow plates with an integral foot portion which is rigidly affixed to the sides of said block with the toe portion thereof adjacent the front end of said block, and a reinforcing component comprising two parallel, thin, narrow plates which, at one end, are fastened to the sides of said block adjacent the rear end thereof and, at the other end, to the plates of said vertical component near the upper end thereof by means of a common rivet which functions also as a spacer to maintain them and the plates of said vertical component in spaced relationship, said elongate block, said vertical component and said reinforcing component forming a rigid, reinforcing triangle;

adjustable means adjacent the front end of said block for adjustably affixing said block to said bed;

a clamping arm comprising two parallel, thin, narrow plates spaced apart by spacers a distance such that the free ends of one leg fit in between the plates of said vertical component in juxtaposition thereto and is pivoted thereto in the mid-portion thereof;

a clamping face pivoted at the other end of said clamping arm, said clamping arm extending beyond said base member so that said clamping face is in position to engage a work piece resting on the bed of said machine tool, and clamping means, comprising a first block member having trunnions journaled in the free ends of the plates of the vertical component, a second block member having trunnions journaled in th plates of said clamping arm in the mid-portion thereof, and an elongate threaded bolt threaded through said first block and journaled in said second block with a thrust bearing, which clamping means is operative to move said clamping arm to and from clamping position and to clamp said clamping face to the work piece after the clamping face has been brought in contact therewith.

* * * * *

UNITED STATES PATENT AND TRADEMARK OFFICE

CERTIFICATE OF CORRECTION

PATENT NO. : 4,245,827

DATED : January 20, 1981

INVENTOR(S) : Otis W. Goff et al.

It is certified that error appears in the above—identified patent and that said Letters Patent is hereby corrected as shown below:

Column 1, lines 65 & 66, "do-gleg-" should read -- dog-leg- --.

Column 3, line 7, "trunnions" should read -- trunnion --.

Column 3, line 39, "82a" (second occurrence) should read -- 82b --.

Column 4, line 43, "th" should read -- the --.

Signed and Sealed this

*Ninth* Day of *June 1981*

[SEAL]

*Attest:*

RENE D. TEGTMEYER

*Attesting Officer* *Acting Commissioner of Patents and Trademarks*